(12) United States Patent
Oh et al.

(10) Patent No.: US 11,941,180 B2
(45) Date of Patent: Mar. 26, 2024

(54) ELECTRONIC DEVICE FOR OBTAINING USER INPUT THROUGH VIRTUAL KEYBOARD AND METHOD OF OPERATING THE SAME

(71) Applicant: Samsung Electronics Co., Ltd., Gyeonggi-do (KR)

(72) Inventors: Yanggeun Oh, Gyeonggi-do (KR); Byungjun Son, Gyeonggi-do (KR); Sungjoo Ahn, Gyeonggi-do (KR); Sungwook Youn, Gyeonggi-do (KR); Jiyoon Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 17/749,610

(22) Filed: May 20, 2022

(65) Prior Publication Data

US 2023/0070539 A1 Mar. 9, 2023

Related U.S. Application Data

(63) Continuation of application No. PCT/KR2022/006269, filed on May 2, 2022.

(30) Foreign Application Priority Data

Sep. 6, 2021 (KR) .......................... 10-2021-0118348
Oct. 8, 2021 (KR) .......................... 10-2021-0133683

(51) Int. Cl.
*G06F 3/01* (2006.01)
*G06F 3/14* (2006.01)

(52) U.S. Cl.
CPC .............. *G06F 3/017* (2013.01); *G06F 3/011* (2013.01); *G06F 3/14* (2013.01)

(58) Field of Classification Search
CPC . G06F 3/017; G06F 3/011; G06F 3/14; G06F 3/0426
See application file for complete search history.

(56) References Cited

U.S. PATENT DOCUMENTS

| 6,512,838 B1 * | 1/2003 | Rafii ..................... G06F 1/1632 |
| | | 348/E3.018 |
| 9,898,809 B2 * | 2/2018 | Xie ........................... G06T 5/30 |

(Continued)

FOREIGN PATENT DOCUMENTS

| EP | 2 725 458 | 4/2014 |
| JP | 09-054646 | 2/1997 |

(Continued)

OTHER PUBLICATIONS

International Search Report dated Aug. 5, 2022 issued in counterpart application No. PCT/KR2022/006269, 8 pages.

*Primary Examiner* — Grant Sitta
(74) *Attorney, Agent, or Firm* — The Farrell Law Firm, P.C.

(57) ABSTRACT

An electronic device is provided and includes a camera, a display, and a processor. The processor may be configured to control the display to display a second image determined based on a posture of the electronic device from a first image obtained using the camera, detect a finger object from the second image, identify a first virtual key corresponding to the finger object from a virtual keyboard based on a position and a degree of bending of the finger object, and identify an input of the first virtual key based on detecting a typing movement of the finger object. Other embodiments may also be possible.

20 Claims, 13 Drawing Sheets

(56) References Cited

U.S. PATENT DOCUMENTS

| | | | |
|---|---|---|---|
| 10,719,137 B1 | 7/2020 | Kamepalli et al. | |
| 10,719,173 B2* | 7/2020 | Richardson | G06F 3/0426 |
| 11,150,800 B1* | 10/2021 | Longest | G06F 3/0233 |
| 11,380,000 B2* | 7/2022 | Mochizuki | G06F 3/0346 |
| 11,537,239 B1* | 12/2022 | Hakim | G06F 3/0482 |
| 11,709,593 B2* | 7/2023 | Chung | G06F 3/0304 |
| | | | 715/773 |
| 2005/0024338 A1* | 2/2005 | Ye | G06F 3/0219 |
| | | | 345/168 |
| 2006/0114233 A1* | 6/2006 | Radivojevic | G06F 3/0426 |
| | | | 345/168 |
| 2012/0154313 A1* | 6/2012 | Au | G06F 3/04883 |
| | | | 345/173 |
| 2012/0249587 A1* | 10/2012 | Anderson | G06F 3/04895 |
| | | | 345/633 |
| 2013/0265218 A1* | 10/2013 | Moscarillo | G06F 3/0426 |
| | | | 345/156 |
| 2013/0265219 A1* | 10/2013 | Sato | G06F 1/1673 |
| | | | 345/156 |
| 2013/0328769 A1 | 12/2013 | Jung | |
| 2016/0085379 A1 | 3/2016 | Cho et al. | |
| 2017/0017393 A1* | 1/2017 | Luo | G06F 3/04812 |
| 2018/0196567 A1* | 7/2018 | Klein | G06F 3/0414 |
| 2018/0300008 A1* | 10/2018 | Rasanen | G06F 3/04886 |
| 2021/0065455 A1* | 3/2021 | Beith | G06F 1/163 |
| 2021/0081104 A1* | 3/2021 | Chung | G06F 3/0426 |

FOREIGN PATENT DOCUMENTS

| | | |
|---|---|---|
| JP | 2014-120131 | 6/2014 |
| JP | 2014-165660 | 9/2014 |
| KR | 1020100041464 | 4/2010 |
| KR | 1020160011451 | 2/2016 |
| KR | 10-2019-0114616 | 10/2019 |
| KR | 10-2021-0015577 | 2/2021 |
| KR | 1020210033394 | 3/2021 |

* cited by examiner

<501>

<502>

<1001>

<1002>

ELECTRONIC DEVICE FOR OBTAINING USER INPUT THROUGH VIRTUAL KEYBOARD AND METHOD OF OPERATING THE SAME

CROSS-REFERENCE TO RELATED APPLICATION(S)

This application is a Bypass Continuation application of PCT International Application No. PCT/KR/2022/006269, which was filed on May 2, 2022, in the Korean Intellectual Property Office, and claims priority to Korean Patent Application No. 10-2021-0118348, which was filed on Sep. 6, 2021, in the Korean Intellectual Property Office, and Korean Patent Application No. 10-2021-0133683, which was filed on Oct. 8, 2021, in the Korean Intellectual Property Office, the content of each of which is incorporated herein by reference.

BACKGROUND

1. Field

The disclosure relates to an electronic device for obtaining a user input through a virtual keyboard, and a method of operating the same.

2. Description of Related Art

Recently, due to the development of technology, it has become popular to mount cameras in various electronic devices. In portable devices, tasks such as writing an e-mail, writing reports, chatting using a messenger, and creating content may be performed by entering characters through interfaces such as an on-screen keyboard, a portable physical keyboard, and a voice keyboard.

When a motion of a user's hand with respect to a virtual keyboard is uniformly detected using an image obtained by a camera without considering the posture of an electronic device, a typographical error rate of the virtual keyboard may be relatively high. Further, when columns of the virtual keyboard are fixedly matched for each user's finger without considering a position and a degree of bending of the user's finger, it may be difficult to distinguish inputs to keys existing in the same column in the virtual keyboard, and it may also be difficult to change the layout of the virtual keyboard.

According to various embodiments, an electronic device may provide a guide image for accurately detecting an input to a virtual keyboard, identify a virtual key corresponding to a finger based on a position and a degree of bending of the user's finger, and determine whether the virtual key is input based on a movement of the finger.

SUMMARY

The present disclosure has been made to address the above-mentioned problems and disadvantages, and to provide at least the advantages described below.

According to various embodiments, an electronic device may include a camera, a display, and a processor, and the processor may be configured to, control the display to display a second image determined based on a posture of the electronic device from a first image obtained using the camera, detect a finger object from the second image, identify a first virtual key corresponding to the finger object from a virtual keyboard based on a position and a degree of bending of the finger object, and identify an input of the first virtual key based on detecting a typing movement of the finger object.

According to various embodiments, a method of operating an electronic device may include controlling a display of the electronic device to display a second image determined based on a posture of the electronic device from a first image obtained using a camera of the electronic device, detecting a finger object from the second image, identifying a first virtual key corresponding to the finger object from a virtual keyboard based on a position and a degree of bending of the finger object, and identifying an input of the first virtual key based on detecting a typing movement of the finger object.

According to various embodiments, an electronic device may include a camera, a display, and a processor, and the processor may be configured to, while executing a first application, control the display to display a second image determined based on a posture of the electronic device from a first image obtained through the camera, together with a virtual keyboard, when a finger object detected from the second image does not meet a predetermined condition, control the display to display a guide indicator corresponding to the predetermined condition, and when the finger object meets the predetermined condition, control the display to display a visual effect on a graphic user interface of a first virtual key corresponding to the finger object.

According to various embodiments, there are provided an electronic device and an operating method thereof, which may accurately identify a virtual key that a user desires to input, based on a position and a degree of bending of a user's finger, provide a visual effect to distinguish the identified virtual key from other virtual keys, and provide a guide image for accurately detecting an input to a virtual keyboard, thereby improving the convenience of the user's typing input on the virtual keyboard.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
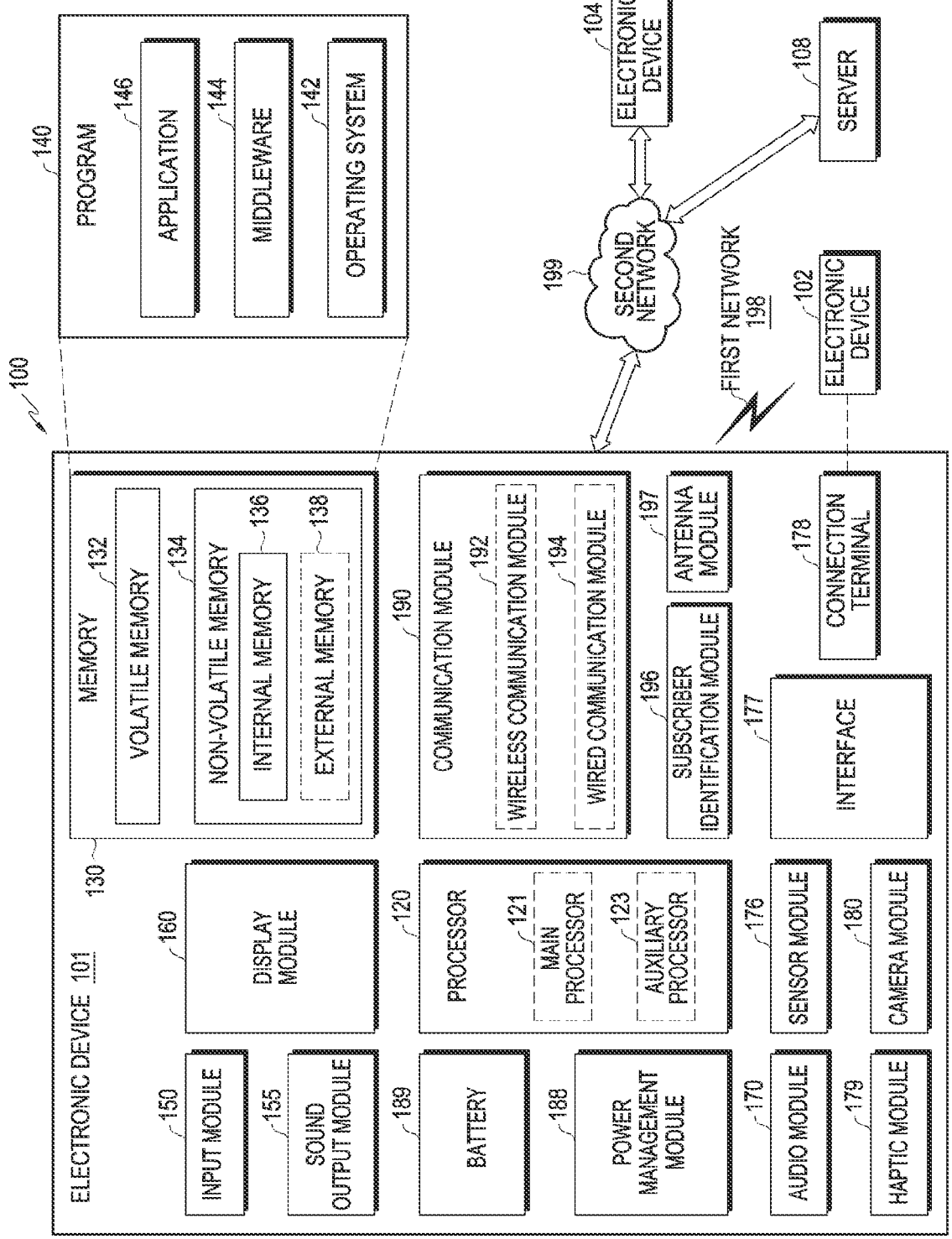
FIG. 1 is a block diagram of an electronic device in a network environment, according to various embodiments of the disclosure.

Various embodiments of the present disclosure are described with reference to the accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

FIG. 1 is a block diagram illustrating an electronic device in a network environment according to various embodiments of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 1301. According to an embodiment, some (e.g., the sensor module 176, the camera module 180, or the antenna module 197) of the components may be integrated into a single component (e.g., the display module 160).

The processor 120 may execute, e.g., software (e.g., a program 140) to control at least one other component (e.g., a hardware or software component) of the electronic device 101 connected with the processor 120 and may process or compute various data. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain a sound through the input module 150 or output a sound through the sound output module 155 or an external electronic device (e.g., an electronic device 102 (e.g., a speaker or a headphone) directly or wirelessly connected with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or wireless communication channel between the electronic device 101 and an external electronic device (e.g., the electronic device 102, the electronic device 104, or the server 108) and performing communication through the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
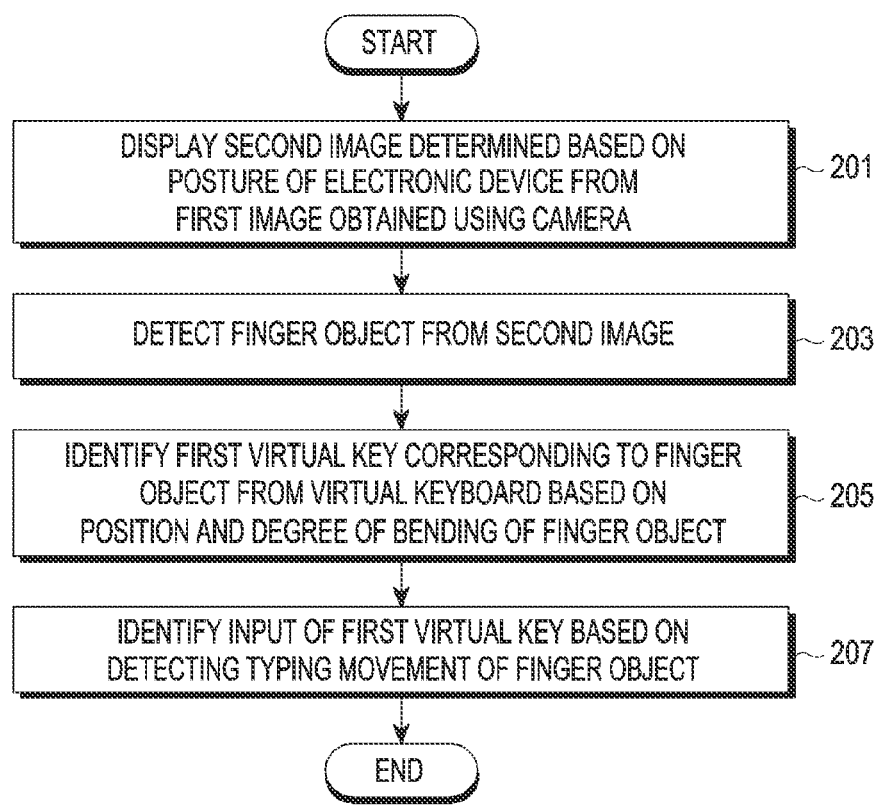
FIG. 2 is a flowchart illustrating a method for obtaining an input of a virtual key corresponding to a finger object by an electronic device, according to various embodiments of the disclosure.

FIG. 2 is a flowchart illustrating a method for obtaining an input of a virtual key corresponding to a finger object by an electronic device (e.g., the electronic device 101 of FIG. 1), according to various embodiments of the disclosure.

In operation 201, according to various embodiments, the electronic device 101 (e.g., the processor 120 of FIG. 1) may control the display 160 to display a second image determined based on a posture of the electronic device 101 from a first image obtained using a camera (e.g., the camera module 180 of FIG. 1). The electronic device 101 may display the second image indicating optimal hand position information on the display 160 in order to accurately detect a typing input to the virtual keyboard.

According to various embodiments, the electronic device 101 (e.g., the processor 120 of FIG. 1) may identify the posture of the electronic device 101 using a sensor module (e.g., the sensor module 176 of FIG. 1), and determine the second image corresponding to a partial region from the entire region of the first image obtained using the camera 180, based on the posture of the electronic device 101.

Figure 3:
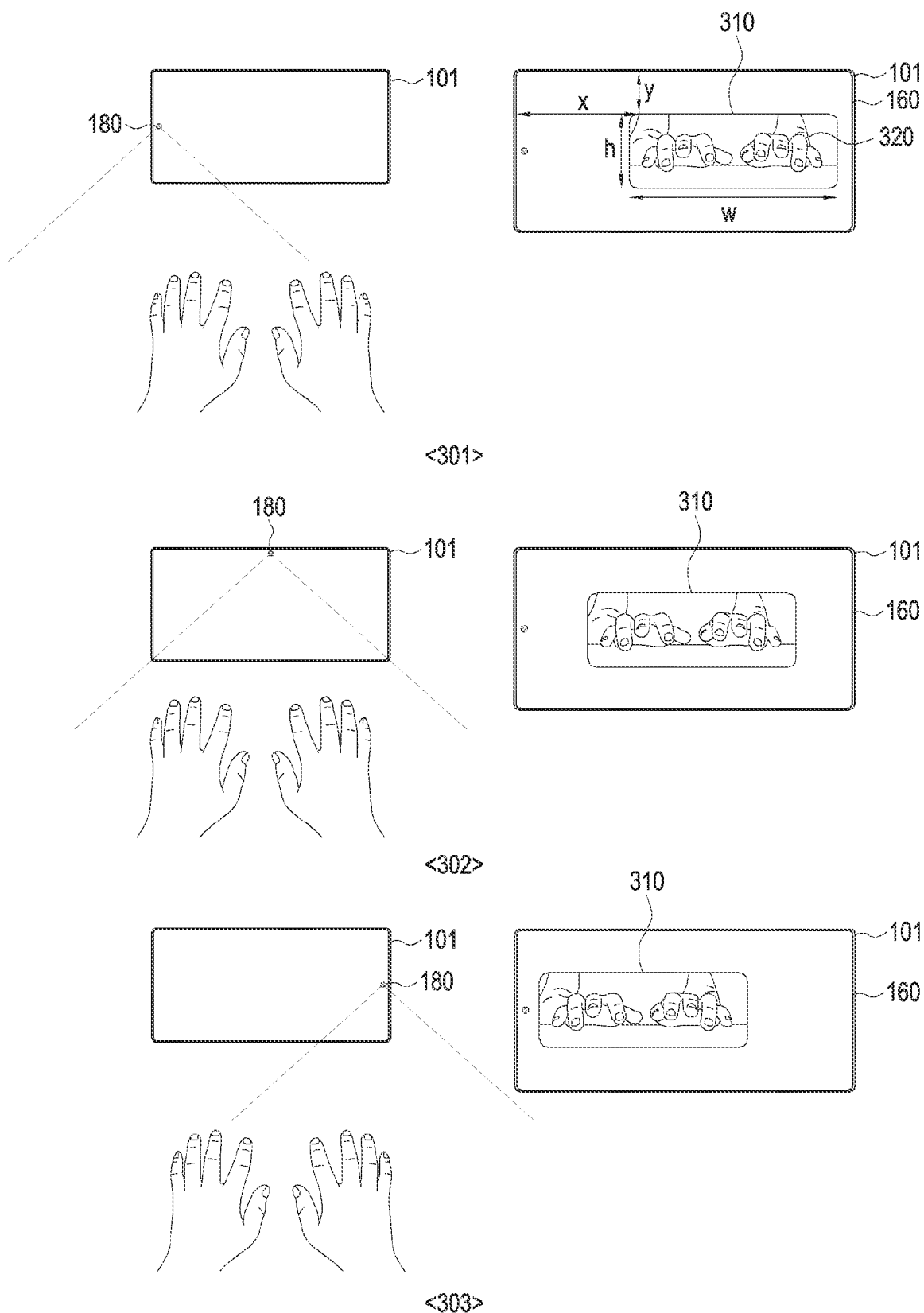
FIG. 3 illustrates an embodiment in which an electronic device displays a second image determined based on a posture of the electronic device, according to various embodiments of the disclosure.

FIG. 3 illustrates an embodiment in which the electronic device 101 displays a second image determined based on a posture of the electronic device 101, according to various embodiments of the disclosure.

For example, referring to <301> of FIG. 3, the electronic device 101 may identify a posture state of the electronic device 101, which indicates a direction (e.g., left) in which the camera 180 is positioned and a degree to which the electronic device 101 is inclined, using the sensor module 176 (e.g., a gyro sensor), and determine the second image 320 from the entire region of the first image (e.g., a preview image) based on the identified posture state of the electronic device 101.

As another example, referring to <302> of FIG. 3, the electronic device 101 may identify, by using the sensor module 176 (e.g., the gyro sensor), the posture state of the electronic device 101, which indicates the direction (e.g., the center) in which the camera 180 is positioned and the degree to which the electronic device 101 is inclined, and determine the second image 320 from the first image based on the identified posture state of the electronic device 101.

As further another example, referring to <303> of FIG. 3, the electronic device 101 may identify, by using the sensor module 176 (e.g., the gyro sensor), the posture state of the electronic device 101, which indicates the direction (e.g., right) in which the camera 180 is positioned and the degree to which the electronic device 101 is inclined, and determine the second image 320 from the first image based on the identified posture state of the electronic device 101. According to an embodiment, the electronic device 101 may determine the size of the second image 320 based on the size of the first image.

For example, referring to <301> of FIG. 3, the electronic device 101 may determine the number, w of horizontal pixels (e.g., 2/m) and the number, h of vertical pixels (e.g., n/3) of the second image 320, based on the number, in of horizontal pixels and the number, n of vertical pixels of the first image, which correspond to the resolution of the camera 180. According to an embodiment, the size of the second image 320 may be predefined in a table when the electronic device 101 is manufactured, and stored in a memory (e.g., the memory 130 of FIG. 1).

According to various embodiments, the electronic device 101 (e.g., the processor 120 of FIG. 1) may display the determined second image 320 through a guide area 310. For example, referring to <301> of FIG. 3, the electronic device 101 may display the second image 320 cropped from the first image through the guide area 310 existing at a specific position (x,y) of the display 160. According to an embodiment, the location and size of the guide area 310 may be determined by the manufacturer of the electronic device 101, or may be determined according to a user input (e.g., a drag input).

In operation 203, according to various embodiments, the electronic device 101 (e.g., the processor 120 of FIG. 1) may detect a finger object from the second image 320. According to an embodiment, the electronic device 101 may analyze the second image 320 to determine whether a finger object exists in the second image 320. For example, referring to <301> of FIG. 3, the electronic device 101 may detect a finger object from the second image 320 being displayed through the guide area 310. According to an embodiment, the electronic device 101 may identify 3D coordinate information of the finger object using at least one of an RGB camera (e.g., a 2D camera) or a depth camera (e.g., a 3D camera) of the camera 180. For example, the electronic device 101 may identify 3D coordinate information (x, y, z) about the tip of the finger object using the camera 180.

In operation 205, according to various embodiments, the electronic device 101 (e.g., the processor 120 of FIG. 1) may identify a first virtual key corresponding to the finger object from the virtual keyboard based on a position and a degree of bending of the finger object.

According to various embodiments, the electronic device 101 (e.g., the processor 120 of FIG. 1) may identify a plurality of regions from the second image 320, and match key columns of the virtual keyboard to the plurality of regions. According to an embodiment, the electronic device 101 may identify, from the second image 320, a plurality of regions having an interval determined based on the position of each finger object, and match key columns of the virtual keyboard to the plurality of regions.

Figure 4:
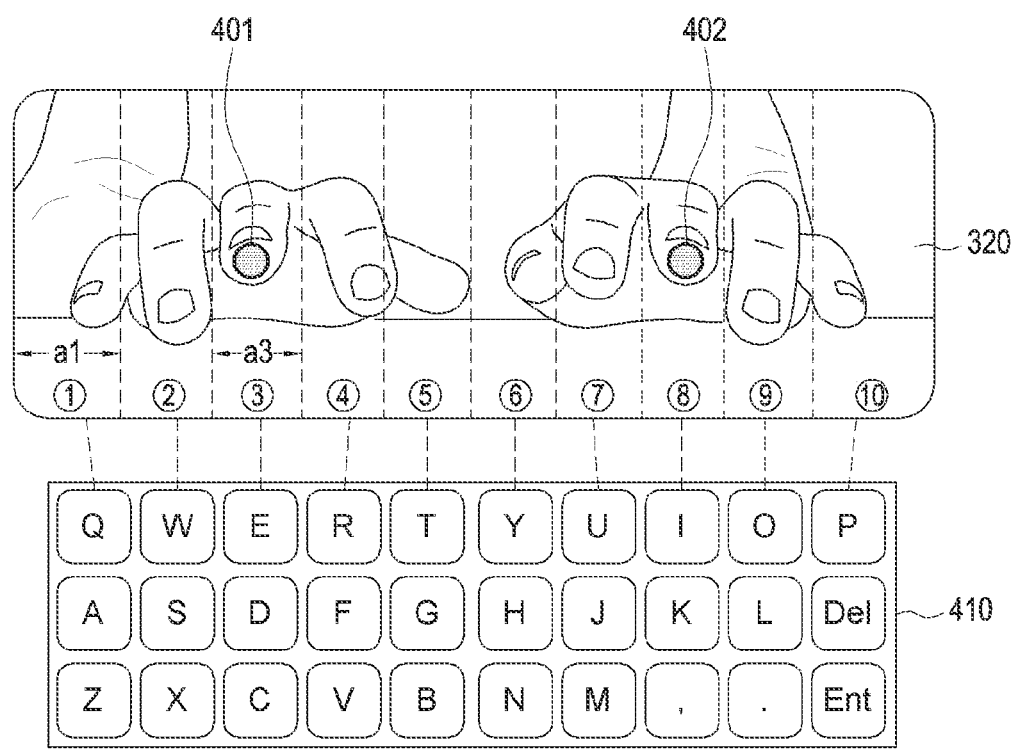
FIG. 4 illustrates an embodiment in which an electronic device maps each key column of a virtual keyboard to each region of a second image, according to various embodiments.

FIG. 4 illustrates an embodiment in which the electronic device 101 maps each key column of a virtual keyboard to each region of the second image, according to various embodiments of the disclosure.

For example, referring to FIG. 4, the electronic device 101 may identify coordinates of a tip 401 of a third finger object (e.g., the middle finger of the left hand), identify a third region having an interval (e.g., a3) determined based on the coordinates, and match a third column (e.g., E, D, and C) of the virtual keyboard to the third region.

In the above method, the electronic device 101 may match each key column of a virtual keyboard 410 to each region of the second image 320. According to an embodiment, the number of the plurality of regions may be the same as the number of key columns of the virtual keyboard 410. According to an embodiment, the electronic device 101 may identify a plurality of regions having a predetermined interval from the second image 320, and may match key columns of the virtual keyboard to the plurality of regions.

For example, referring to FIG. 4, the electronic device 101 may identify a first region having a predetermined interval (e.g., a1) with respect to the first region from the second image 320, and match a first column (e.g., Q, A, and Z) of the virtual keyboard 410 to the first region. The respective predetermined intervals may be equal to or different from each other, and may be determined by the manufacturer of the electronic device 101.

According to various embodiments, the electronic device 101 (e.g., the processor 120 of FIG. 1) may determine a key column of the virtual keyboard 410, which corresponds to a position of a finger object. According to an embodiment, after matching key columns of the virtual keyboard 410 to a plurality of regions of the second image 320, the electronic device 101 may determine a key column of the virtual keyboard, which corresponds to a position of a specific portion of a finger object, based on detecting the finger object from the second image 320.

For example, referring to FIG. 4, the electronic device 101 may identify coordinates of a tip 402 of an eighth finger object (e.g., the middle finger of the right hand), and determine a key column (e.g., an eighth column) of the virtual keyboard 410, which corresponds to an eighth region to which the coordinates belong, as a key column corresponding to the position of the eighth finger object.

Figure 5A:
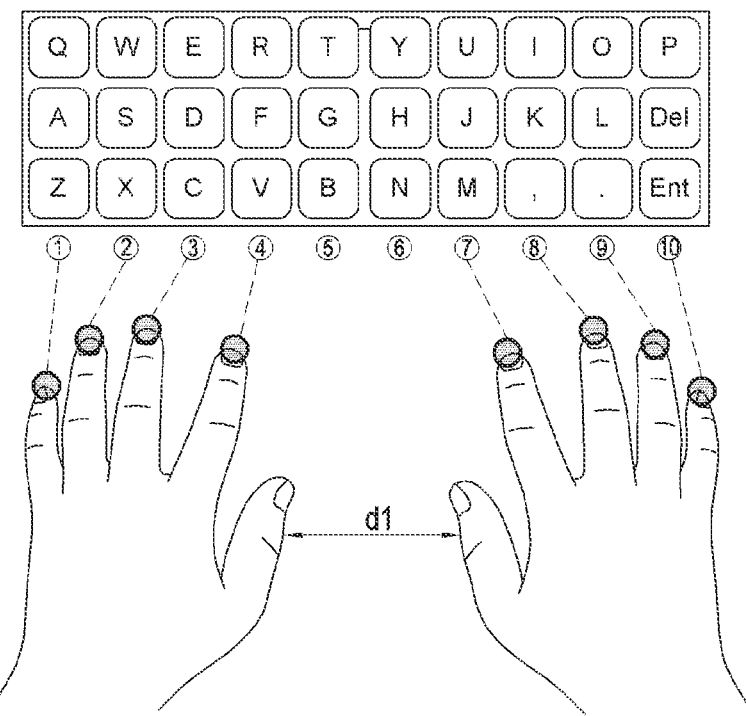
FIG. 5A illustrates a first embodiment in which an electronic device determines key columns corresponding to finger objects from a virtual keyboard, according to various embodiments of the disclosure.
Figure 5A:
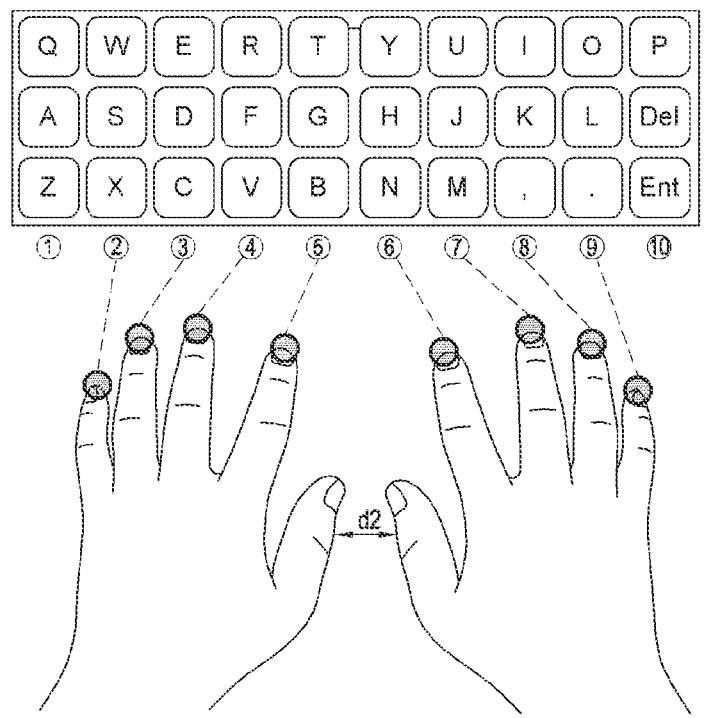

FIG. 5A illustrates a first embodiment in which the electronic device 101 determines key columns corresponding to finger objects from the virtual keyboard, according to various embodiments of the disclosure.

For example, referring to <501> of FIG. 5A, due to the distance (e.g., d1) between the user's hands, when the coordinates of the positions of a first finger object (e.g., the little finger of the left hand) to a fourth finger object (e.g., the index finger of the left hand) belong to a first region to a fourth region of the second image 320, respectively, the electronic device 101 may determine the first to fourth columns of the virtual keyboard 410, which correspond to the first to fourth regions, as key columns corresponding to the positions of the first to fourth finger objects. In the above situation, the electronic device 101 may determine seventh to tenth columns of the virtual keyboard 410 as key columns corresponding to the positions of a seventh finger object (e.g., the index finger of the right hand) to a tenth finger object (e.g., the little finger of the right hand).

According to various embodiments, the electronic device 101 (e.g., the processor 120 of FIG. 1) may change the key column corresponding to the position of the finger object, based on the change in the position of the finger object. According to an embodiment, when a position of a specific portion of the finger object is changed from a first position to a second position, the electronic device 101 may change the key column of the virtual keyboard 410, which corresponds to the position of the finger object, from a first specific column to a second specific column. For example, referring to <501> and <502> of FIG. 5A, as the distance between the user's hands is changed from a first distance (e.g., d1) to a second distance (e.g., d2), when the positions of the finger objects are changed so that the coordinates of the positions of the first finger object (e.g., the little finger of the left hand) to the fourth finger object (e.g., the index finger of the left hand) belong, to second to fifth regions of the second image 320, respectively, the electronic device 101 may change the key columns corresponding to the positions of the first to fourth finger objects to second to fifth columns of the virtual keyboard 410, which correspond to the second to fifth regions. In the above situation, the electronic device 101 may change the key columns corresponding to the positions of the seventh finger object (e.g., the index finger of the right hand) to the tenth finger object (e.g., the little finger of the right hand) to sixth to ninth columns of the virtual keyboard 410.

According to an embodiment, the electronic device 101 may determine key columns of the virtual keyboard 410, which correspond to the positions of the remaining finger objects except for predetermined finger objects. For example, referring to <501> and <502> of FIG. 5A, the electronic device 101 may determine key columns of the virtual keyboard 410, which correspond to the positions of the remaining finger objects (e.g., the index finger to little finger of the left and right hands) except for the predetermined finger objects (e.g., left and right thumbs). This is because, when a predetermined finger object (e.g., a thumb) corresponds to only one specific key (e.g., the space bar), there is no need to perform an operation of determining key columns in order to distinguish a plurality of key columns.

Figure 5B:
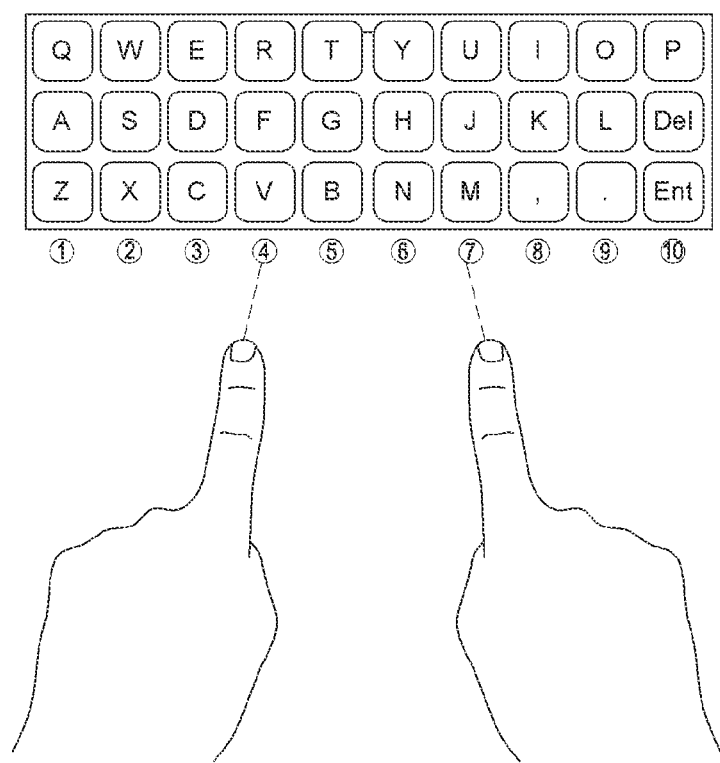
FIG. 5B illustrates a second embodiment in which an electronic device determines key columns corresponding to finger objects from a virtual keyboard, according to various embodiments of the disclosure.

FIG. 5B illustrates a second embodiment in which the electronic device 101 determines key columns corresponding to finger objects from the virtual keyboard, according to various embodiments of the disclosure.

According to an embodiment, the electronic device 101 may determine key columns of the virtual keyboard 410, which correspond to the positions of pre-set finger objects. For example, referring to FIG. 5B, the electronic device 101 may identify the coordinates of the tips of the fourth finger object (e.g., the index finger of the left hand) and the seventh finger object (e.g., the index finger of the right hand), which are pre-set finger objects, and determine key columns (e.g., the fourth column and the seventh column) of the virtual keyboard 410, which correspond to the regions to which the coordinates belong, as key columns corresponding to the pre-set finger objects.

According to various embodiments, the electronic device 101 (e.g., the processor 120 of FIG. 1) may identify a first virtual key corresponding to a finger object, based on a key column corresponding to the position of the finger object and a key row corresponding to the degree of bending of the finger object.

Figure 6A:
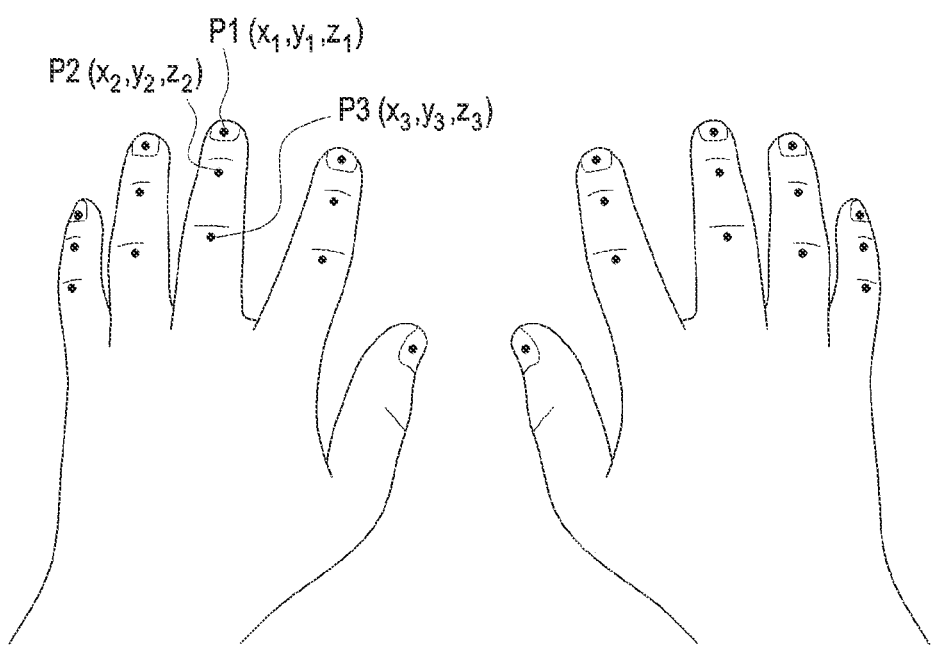
FIG. 6A illustrates a first embodiment in which an electronic device identifies a virtual key specified by a key row corresponding to a degree of bending of a finger object, according to various embodiments of the disclosure.

FIG. 6A illustrates a first embodiment in which the electronic device 101 identifies a virtual key specified by a key row corresponding to a degree of bending of a finger object, according to various embodiments of the disclosure.

According to various embodiments, the electronic device 101 (e.g., the processor 120 of FIG. 1) may identify the degree of bending of the finger object by using at least two coordinates of the finger object from the second image 320. For example, referring to FIG. 6A, the electronic device 101 may detect coordinate information (e.g., p1(x1, y1, z1), p2(x2, y2, z2), and p3(x3, y3, z3)) of predetermined portions of the third finger object (e.g., the middle finger of the left hand) from the second image 320, and identify a degree of bending of the third finger object by using two pieces (e.g., p1 and p3) of coordinate information among the coordinate information. According to an embodiment, the electronic device 101 may identify the degree of bending of the finger object based on a distance between at least two coordinates of the finger object. According to an embodiment, the electronic device 101 may determine the degree of bending of the finger object as a first bending state, when a first distance on a first axis between first coordinates and second coordinates of the finger object exceeds a first threshold and a second distance on a second axis is less than a second threshold.

Figure 6B:
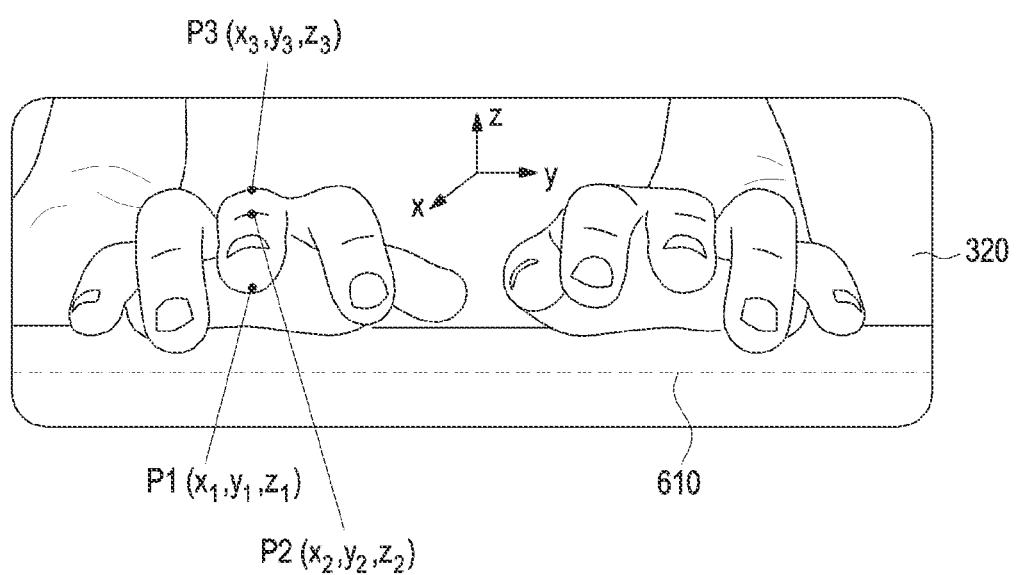
FIG. 6B illustrates a second embodiment in which an electronic device identifies a virtual key specified by a key row corresponding to a degree of bending of a finger object, according to various embodiments of the disclosure.

FIG. 6B illustrates a second embodiment in which the electronic device 101 identifies a virtual key specified by a key row corresponding to a degree of bending of a finger object, according to various embodiments of the disclosure.

For example, referring to FIG. 6B, the electronic device 101 may determine the degree of bending of the third finger object as the first bending state, when the first distance (e.g., x3−x1) on the x-axis between the first coordinates p1 and the second coordinates p3 of the third finger object (e.g., the middle finger of the left hand) exceeds the first threshold and the second distance (e.g., z3−z1) on the z-axis between the first coordinates p1 and the second coordinates p3 is less than the second threshold. According to an embodiment, the electronic device 101 may determine the degree of bending of the finger object as a third bending state, when the first distance on the first axis between the first coordinates and the second coordinates of the finger object is less than a third threshold and the second distance on the second axis exceeds a fourth threshold.

For example, referring to FIG. 6B, the electronic device 101 may determine the degree of bending of the third finger object as the third bending state, when the first distance (e.g., x3−x1) on the x-axis between the first coordinates p1 and the second coordinates p3 of the third finger object (e.g., the middle finger of the left hand) is less than the third threshold, and the second distance (e.g., z3−z1) on the z-axis between the first coordinates p1 and the second coordinates p3 exceeds the fourth threshold. According to an embodiment, the electronic device 101 may determine the degree of bending of the finger object as a second bending state, when the degree of bending of the finger object is not in the first bending state and the third bending state.

For example, referring to FIG. 6B, the electronic device 101 may determine the degree of bending of the third finger object as the second bending state, when the first distance (e.g., x3−x1) on the x-axis between the first coordinate p1 and the second coordinate p3 of the third finger object (e.g., the middle finger of the left hand) is a value between the third threshold and the first threshold, and/or when the second distance (e.g. z3−z1) on the z-axis between the first coordinates p1 and the second coordinates p3 is a value between the second threshold and the fourth threshold. According to an embodiment, the first threshold may be greater than the third threshold, and the fourth threshold may be greater than the second threshold. According to an embodiment, the first to fourth thresholds for each finger object may be set differently for each finger object. For example, the first threshold for the first finger object and the first threshold for the second finger object may be different from each other.

According to various embodiments, the electronic device 101 (e.g., the processor 120 of FIG. 1) may identify a first virtual key specified by a key row corresponding to a degree of bending of a finger object from a plurality of virtual keys included in a key column corresponding to a position of the finger object. According to an embodiment, the electronic device 101 may identify, as a first virtual key, a key in a first row corresponding to a first bending state of the finger object from a plurality of virtual keys included in a key column corresponding to the position of the finger object. For example, referring to <501> of FIG. 5A, the electronic device 101 may identify, as the first virtual key, a key (e.g., R) in the first row corresponding to the first bending state of a fourth finger object from a plurality of virtual keys (e.g., R, F, and V) included in the fourth column of the virtual keyboard 410, which corresponds to the coordinates of the fourth finger object (e.g., the index finger of the left hand). According to an embodiment, the electronic device 101 may identify, as the first virtual key, a key in a second row corresponding to the second bending state of the finger object from the plurality of virtual keys included in the key column corresponding to the position of the finger object.

For example, referring to <501> of FIG. 5A, the electronic device 101 may identify, as the first virtual key, a key (e.g., F) in the second row corresponding to the second bending state of the fourth finger object from the plurality of virtual keys (e.g., R, F, and V) included in the fourth column of the virtual keyboard 410, which corresponds to the coordinates of the fourth finger object (e.g., the index finger of the left hand). According to an embodiment, the electronic device 101 may identify, as the first virtual key, a key in a third row corresponding to the third bending state of the finger object among the plurality of virtual keys included in the key column corresponding to the position of the finger object.

For example, referring to <501> of FIG. 5A, the electronic device 101 may identify, as the first virtual key, a key (e.g., V) in the third row corresponding to the third bending state of the fourth finger object among the plurality of virtual keys (e.g., R, F, and V) included in the fourth column of the virtual keyboard 410, which corresponds to the coordinates of the fourth finger object (e.g., the index finger of the left hand).

According to various embodiments, the electronic device 101 (e.g., the processor 120 of FIG. 1) may identify a second virtual key specified by a key row corresponding to a confidence value of a finger object from a plurality of virtual keys included in a key column corresponding to the position of the finger object. The confidence value may indicate information for selecting a second virtual key as a candidate virtual key in addition to the first virtual key, when the reliability of the first virtual key is low since the first distance on the x-axis and/or the second distance on the z-axis of the finger object correspond to values in the vicinity of the respective thresholds (e.g., the first to fourth thresholds). According to an embodiment, the electronic device 101 may identify confidence values of the remaining virtual keys other than the first virtual key from a plurality of virtual keys included in a key column corresponding to the position of the finger object. For example, referring to <501> of FIG. 5A, when the first virtual key (e.g., F) is specified based on the position and the degree of bending of the fourth finger object (e.g., the index finger of the left hand), the electronic device 101 may identify confidence values of the remaining virtual keys (e.g., R and V). According to an embodiment, the electronic device 101 may identify a second virtual key having a confidence value exceeding a preset value or having the highest confidence value among the remaining virtual keys. For example, the electronic device 101 may identify a second virtual key (e.g., V) having a confidence value exceeding a preset value or having the highest confidence value among the remaining virtual keys (e.g., R and V). According to an embodiment, the electronic device 101 may identify a confidence value of each of a plurality of virtual keys included in a key column corresponding to the finger object by using a deep learning model learned based on the degree of bending of the finger object.

Figure 7:
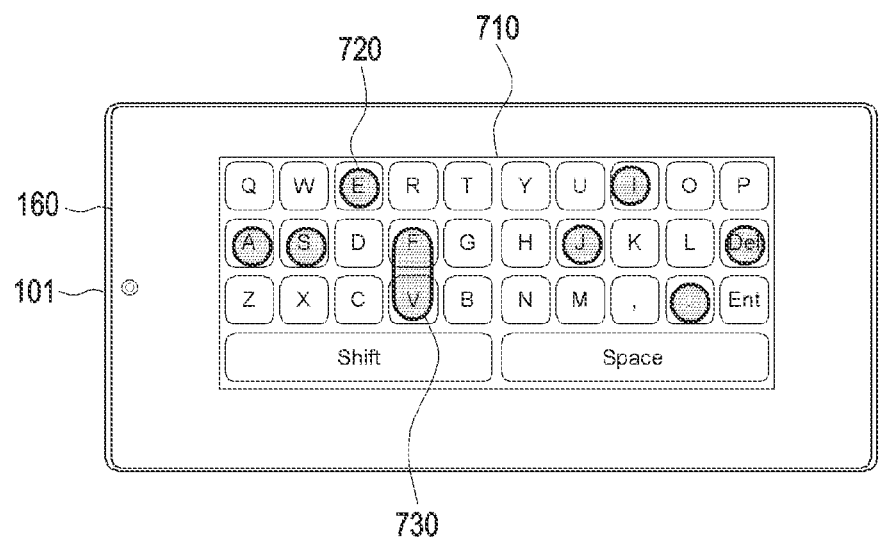
FIG. 7 illustrates an embodiment in which an electronic device displays visual effects on graphical user interfaces (GUIs) of virtual keys corresponding to finger objects, according to various embodiments of the disclosure.

FIG. 7 illustrates an embodiment in which the electronic device 101 displays visual effects on GUIs of virtual keys corresponding to finger objects, according to various embodiments of the disclosure.

According to various embodiments, the electronic device 101 (e.g., the processor 120 of FIG. 1) may control the display 160 to display a visual effect on a graphical user interface (GUI) of the first virtual key. For example, referring to FIG. 7, when the first virtual key (e.g., E) is specified based on the position and the degree of bending of the fourth finger object (e.g., the index finger of the left hand), the electronic device 101 may display a visual effect 720 (e.g., yellow highlight) on the GUI of the first virtual key (e.g., E) in a GUI 710 of the virtual keyboard so that the virtual key indicated by the user's finger can easily be distinguished. According to an embodiment, the electronic device 101 may control the display 160 to display a visual effect on the GUIs of the first virtual key and the second virtual key.

For example, referring to FIG. 7, when the first virtual key (e.g., E) is specified based on the position and the degree of bending of the fourth finger object (e.g., the index finger of the left hand), and the second virtual key (e.g., V) is specified based on the confidence value of the fourth finger object, the electronic device 101 may display a visual effect 730 (e.g., yellow highlight) on the GUIs of the first virtual key (e.g., E) and the second virtual key (e.g., V) in the GUI of the virtual keyboard.

Referring again to FIG. 2, in operation 207, according to various embodiments, the electronic device 101 (e.g., the processor 120 of FIG. 1) may identify an input of the first virtual key based on detecting a typing movement of the finger object. According to an embodiment, the electronic device 101 may detect the typing movement of the finger object based on a specific portion of the finger object moving a predetermined distance or more in the downward direction.

For example, referring to FIG. 6B, the electronic device 101 may detect the typing movement of the third finger object based on the fact that the z-axis coordinate (e.g., z1) of the tip of the third finger object (e.g., the middle finger of the left hand) changes more than a predetermined distance in the downward direction (e.g., −z-axis direction). According to an embodiment, the electronic device 101 may detect a flat object from the second image 320, and may detect the typing movement of the finger object, when a specific portion of the finger object contacts the flat object or enters below a specific reference line.

For example, referring to FIG. 6B, the electronic device 101 may detect the typing movement of the third finger object, when the z-axis coordinate (e.g., z1) of the tip of the third finger object (e.g., the middle finger of the left hand) coincides with the z-axis coordinate constituting the flat object (e.g., the desk surface), or is positioned below a reference line 610 determined based on the positions of the flat object and the third finger object.

According to an embodiment, upon detecting the typing movement of the finger object, the electronic device 101 may identify the input of the first virtual key specified based on the position and the degree of bending of the finger object. For example, referring to <501> of FIG. 5A, when detecting the typing movement of the third finger object (e.g., the middle finger of the left hand), the electronic device 101 may identify the input of the first virtual key (e.g., D) specified based on the position and the degree of bending of the third finger object.

According to an embodiment, when detecting the typing movement of the finger object a predetermined number of times or detecting the typing movement of the finger object together with input of another virtual key, the electronic device 101 may identify an input of the virtual key specified by a key row previously designated for the finger object. For example, referring to <501> of FIG. 5A, when detecting two typing movements (e.g., double stroke) of the third finger object, or detecting the typing movement of the third finger object together with input of another virtual key (e.g., shift key), the electronic device 101 may identify the input of the virtual key (e.g., C) specified by the key row (e.g., the third row) previously designated for the third finger object, without the need to identify the degree of bending of the third finger object.

According to various embodiments, after detecting the typing movement of the finger object, the electronic device 101 (e.g., the processor 120 of FIG. 1) may determine whether the input of the first virtual key corresponding to the finger object is identified based on the degree of subsequent bending of the finger object. According to an embodiment, the electronic device 101 may calculate first typing probabilities of the plurality of virtual keys included in the key column corresponding to the position of the finger object, based on the degree of subsequent bending of the finger object. According to an embodiment, after detecting the typing movement of the finger object, the electronic device 101 may identify the degree of subsequent bending of the finger object using at least two coordinates of the finger object. According to an embodiment, the electronic device 101 may identify the degree of subsequent bending of the finger object by using the 'operation of identifying the degree of bending of the finger object' described in operation 205. For example, referring to <501> of FIG. 5A, after detecting the typing movement of the first finger object (e.g., the little finger of the left hand), the electronic device 101 may calculate a first typing probability (e.g., p(Q), p(A), and p(Z)) of each of the plurality of virtual keys (e.g., Q, A, and Z) included in the key column (e.g., the first column), which correspond to the coordinates of the first finger object, based on the degree of subsequent bending of the first finger object.

According to an embodiment, the electronic device 101 may calculate a second typing probability obtained by applying a weight to the first typing probability of each of the plurality of virtual keys. For example, the electronic device 101 may calculate a second typing probability (e.g., p(Q)*w1) by applying a first weight w1 to the first typing probability of a first virtual key (e.g., Q), calculate a second typing probability (e.g., p(A)*w2) by applying a second weight w2 to the first typing probability of a second virtual key (e.g., A), and calculate a second typing probability (e.g., p(Z)*w3) obtained by applying a third weight w3 to the first typing probability of a third virtual key (e.g., Z).

According to an embodiment, the electronic device 101 may apply the highest weight to the first typing probability of the first virtual key corresponding to the finger object. For example, when the first virtual key (e.g., Q) is specified based on the position and the degree of bending of the first finger object (e.g., the little finger of the left hand) according to operation 205 above, the electronic device 101 may apply the first weight w1 as the highest weight to the first typing probability of the first virtual key. In this case, values of the second weight w2 and the third weight w3 may be lower than a value of the first weight w1, and may be the same as or different from each other. For example, the electronic device 101 may calculate p(Q)*w1, p(A)*w2 (e.g. (1−w1)/2), p(Z)*w3 (e.g. (1−w1)/2) as the second typing probabilities of the first finger object (e.g., the little finger of the left hand), by assigning the highest value to the first weight w1 and the same value to the second weight w2 and the third weight w3. According to an embodiment, a value of the first weight applied to the first typing probability of the first virtual key may be greater than 0.5 and less than 1, and may be set by the manufacturer or the user of the electronic device 101. According to an embodiment, when the virtual key having the highest second typing probability among the calculated second typing probabilities matches the first virtual key, the electronic device 101 may determine to identify the input of the first virtual key.

According to an embodiment, the electronic device 101 may perform an operation (e.g., displaying a character assigned to the first virtual key) corresponding to the input of the first virtual key based on identifying the input of the first virtual key. According to an embodiment, the electronic device 101 may display a word related to the character assigned to the first virtual key on the display 160 using a word auto-complete algorithm based on identifying the input of the first virtual key. The word auto-complete algorithm may use an algorithm known to those skilled in the art. According to an embodiment, the electronic device 101 may learn an input pattern of the first virtual key by monitoring the input of the first virtual key, and when the input of the first virtual key is detected more than a predetermined number of times, the electronic device 101 may increase the weight applied to the first typing probability of the first virtual key. According to an embodiment, as the number of times of deletion of the input first virtual key increases after the input of the first virtual key, the electronic device 101 may decrease the value of the weight applied to the first typing probability of the first virtual key, and increase a value of a weight applied to a first typing probability of another virtual key input after the deletion of the first virtual key According to an embodiment, the electronic device 101 may determine an input effect provided when the virtual key is input, based on the type of the virtual key. For example, the electronic device 101 may provide a first input effect (e.g., a vibration) through the electronic device 101 based on input of a first type (e.g., space bar, enter key, and delete key) of the virtual key, provide a second input effect (e.g., a highlight) on a GUI of the corresponding virtual key through the display 160 based on input of a second type of the virtual key (e.g., a character key), and provide a third input effect (e.g., a sound) for the corresponding virtual key through the speaker of the electronic device 101 based on input of a third type the virtual key (e.g., a numeric key).

Figure 8:
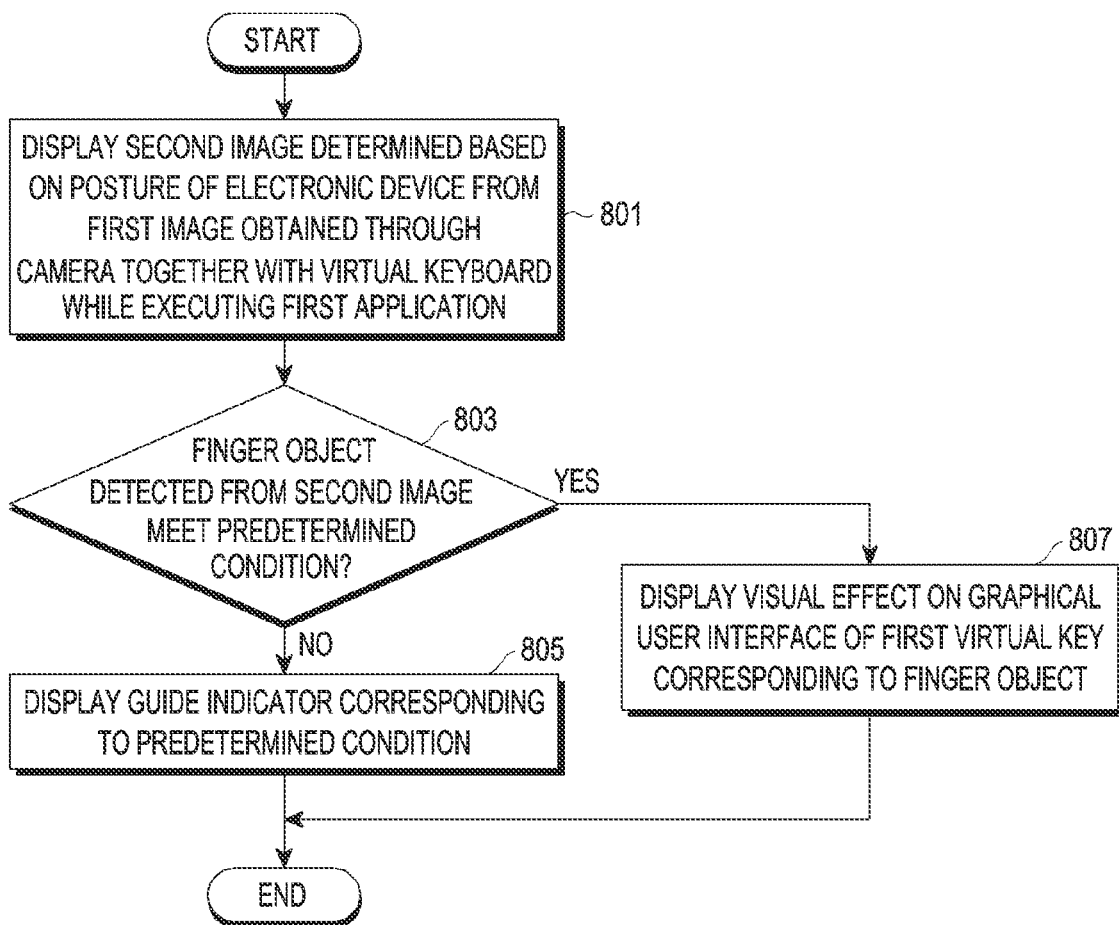
FIG. 8 is a flowchart illustrating a method for displaying a text input through a virtual keyboard on a display by an electronic device, according to various embodiments of the disclosure.

FIG. 8 is a flowchart illustrating a method for displaying a text input through a virtual keyboard on a display (e.g., the display module 160 of FIG. 1) by an electronic device (e.g., the electronic device 101 of FIG. 1), according to various embodiments of the disclosure.

In operation 801, according to various embodiments, the electronic device 101 (e.g., the processor 120 of FIG. 1) may control the display 160 to display a second image (e.g., the second image 320 of FIG. 3) determined based on the posture of the electronic device 101 from the first image obtained through the camera (e.g., the camera module 180 of FIG. 1) together with the virtual keyboard while executing the first application.

Figure 9:
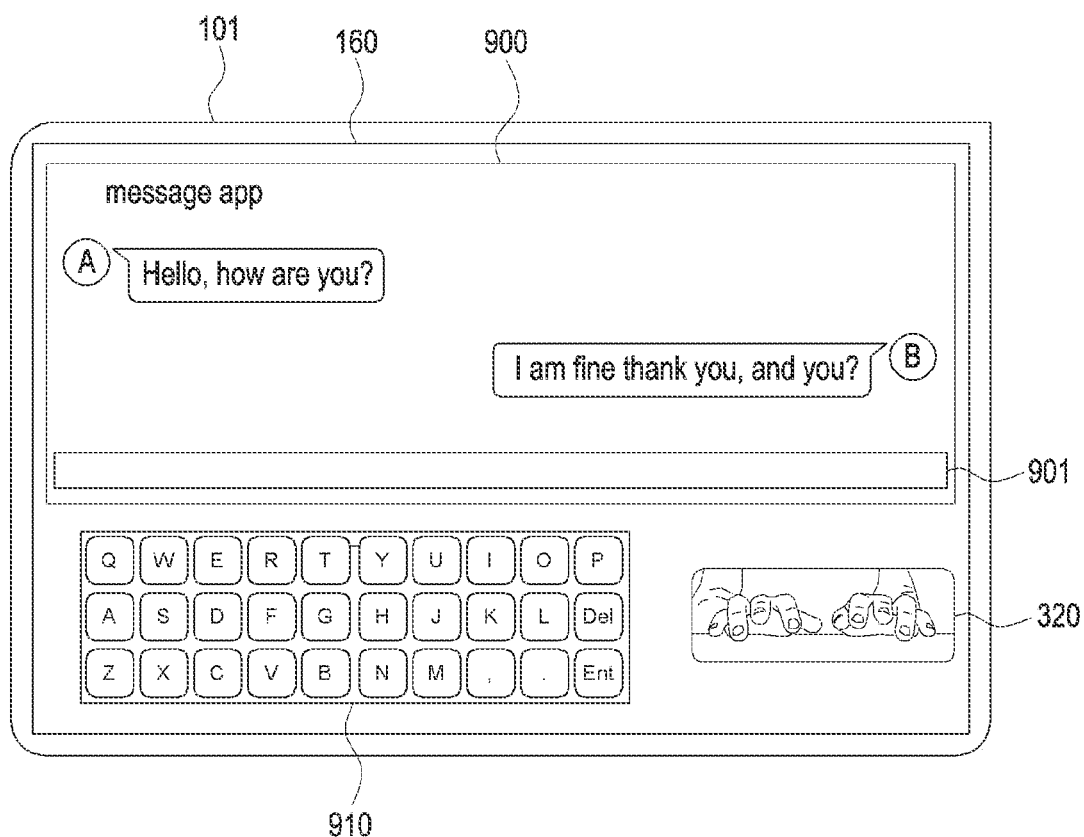
FIG. 9 illustrates an embodiment in which an electronic device displays an execution screen of a first application, a virtual keyboard, and a second image on a display, according to various embodiments of the disclosure.

FIG. 9 illustrates an embodiment in which the electronic device 101 displays an execution screen of a first application, a virtual keyboard, and a second image on the display 160, according to various embodiments of the disclosure.

For example, referring to FIG. 9, the electronic device 101 may display the second image 320 corresponding to a specific region determined based on the posture of the electronic device 101 from the entire region of the first image obtained through the camera 180 together with a virtual keyboard 910 on the display 160 while executing a first application 900 (e.g., a message application). According to an embodiment, the electronic device 101 may select the second image 320 from the first image using the method described in operation 201 of FIG. 2. According to an embodiment, the electronic device 101 may display the execution screen of the first application 900, the virtual keyboard 910, and the second image 320 on the display 160 according to a preset layout. For example, referring to FIG. 9, the electronic device 101 may display the execution screen of the first application 900 on the top of the display 160, display the virtual keyboard 910 on the lower left side of the display 160, and display the second image 320 on the lower right side of the display 160 so as to be adjacent to the virtual keyboard 910, according to the preset layout. According to an embodiment, the electronic device 101 may change the layout regarding the display position and/or display size of each of the execution screen of the first application 900, the virtual keyboard 910, and the second image 320 according to a user input (e.g., a drag input).

In operation 803, according to various embodiments, the electronic device 101 (e.g., the processor 120 of FIG. 1) may determine whether the finger object detected from the second image 320 meets a predetermined condition.

According to an embodiment, when a predetermined finger object is detected from the second image 320, the electronic device 101 may determine that the finger object meets a predetermined condition. For example, when the third finger object (e.g., the middle finger of the left hand) and the eighth finger object (e.g., the middle finger of the right hand) are detected as predetermined finger objects from the second image 320, the electronic device 101 may determine that the finger objects meet the predetermined condition. As another example, when all of the first finger object (e.g., the little finger of the left hand) to the tenth finger object (e.g., the little finger of the right hand) are detected as predetermined finger objects from the second image 320, the electronic device 101 may determine that the finger objects meet the predetermined condition. According to an embodiment, when no predetermined finger object is detected from the second image 320, the electronic device 101 may determine that no finger object meets the predetermined condition.

According to an embodiment, when a ratio of a size of a specific portion of the finger object to the size of the second image 320 exceeds a first threshold ratio and is less than a second threshold ratio in a state in which the electronic device 101 is configured to detect finger objects of both hands from the second image 320, the electronic device 101 may determine that the finger objects meet the predetermined condition. For example, when the ratio of the size of the tip of the third finger object (e.g., the middle finger of the left hand) (e.g., c*d pixels) to the size of the area of the second image 320 (e.g., a*b pixels) exceeds the first threshold ratio (e.g., 0.1) and is less than the second threshold ratio (e.g., 0.2), the electronic device 101 may determine that the finger object meets the predetermined condition.

As another example, when the ratio of the average size of the tips of a plurality of finger objects (e.g., e*f pixels) to the size of the area of the second image 320 (e.g., a*b pixels) exceeds the first threshold ratio (e.g., 0.1) and is less than the second threshold ratio (e.g., 0.2), the electronic device 101 may determine that the finger objects meet the predetermined condition. According to an embodiment, when the ratio of the size of the specific portion of the finger object to the size of the second image 320 is less than or equal to the first threshold ratio or greater than or equal to the second threshold ratio, the electronic device 101 may determine that the finger object does not meet the predetermined condition.

According to an embodiment, when the ratio of a size of a specific portion of the finger object to the size of the second image 320 exceeds a third threshold ratio and is less than a fourth threshold ratio in a state in which the electronic device 101 is configured to detect a finger object of one hand from the second image 320, the electronic device 101 may determine that the finger object meets a predetermined condition. According to an embodiment, the third threshold ratio may be smaller than the first threshold ratio, and the fourth threshold ratio may be smaller than the second threshold ratio. For example, the third threshold ratio may be ½ of the first threshold ratio, and the fourth threshold ratio may be ½ of the second threshold ratio. According to an embodiment, when the ratio of the size of the specific portion of the finger object to the size of the second image 320 is less than or equal to the third threshold ratio or greater than or equal to the fourth threshold ratio, the electronic device 101 may determine that the finger object does not meet the predetermined condition.

In operation 805, according to various embodiments, when the finger object detected from the second image 320 does not meet the predetermined condition, the electronic device 101 (e.g., the processor 120 of FIG. 1) may control the display 160 to display a guide indicator corresponding to the predetermined condition.

Figure 10:
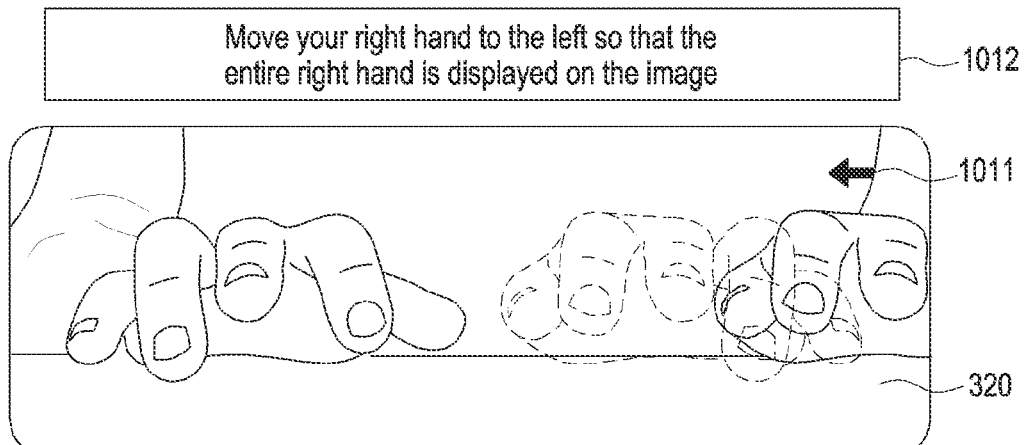
FIG. 10 illustrates an embodiment in which an electronic device displays guide indicators, according to various embodiments of the disclosure.
Figure 10:
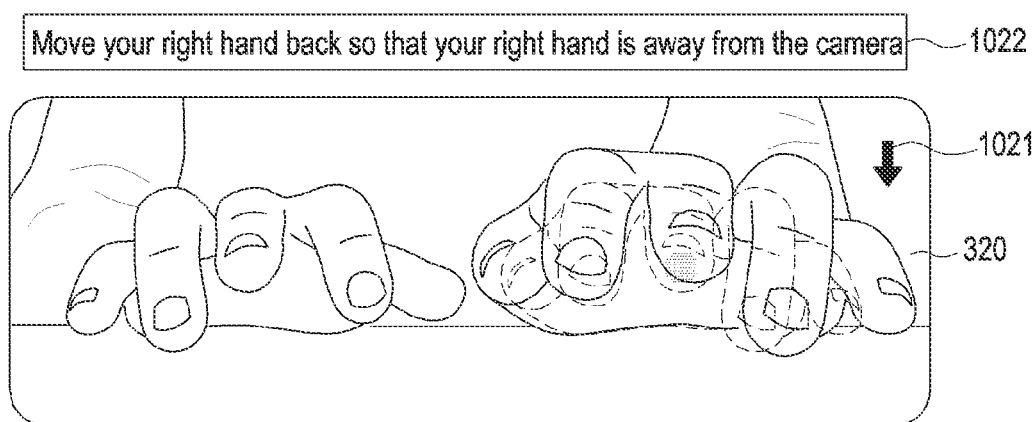

FIG. 10 illustrates an embodiment in which the electronic device 101 displays guide indicators, according to various embodiments of the disclosure.

According to an embodiment, when a predetermined finger object is not detected from the second image 320, the electronic device 101 may control the display 160 to display a guide indicator corresponding to the predetermined finger object. For example, referring to <1001> of FIG. 10, the electronic device 101. For example, referring to <1001> of FIG. 10, when the tenth finger object (e.g., the little finger of the right hand) is not detected from the second image 320, the electronic device 101 may display a first guide indicator 1011 and/or a second guide indicator 1012 as a guide indicator corresponding to the tenth finger object, on the display 160.

According to an embodiment, when the ratio of the size of the specific portion of the finger object to the size of the second image 320 is less than or equal to the first threshold ratio or greater than or equal to the second threshold ratio, the electronic device 101 may control the display 160 to display a guide indicator corresponding to the finger object. For example, referring to <1002> of FIG. 10, when the size of the tip of the third finger object (e.g., the middle finger of the left hand) from the second image 320 is greater than the size of the region determined based on the second image 320 (i.e., greater than the second threshold ratio or more), the electronic device 101 may display a first guide indicator 1021 and/or a second guide indicator 1022 as a guide indicator corresponding to the third finger object, on the display 160.

In operation 807, according to various embodiments, when the finger object detected from the second image 320 meets a predetermined condition, the electronic device 101 (e.g., the processor 120 of FIG. 1) may control the display 160 to display a visual effect on a graphical user interface (GUI) of the first virtual key corresponding to the finger object. According to an embodiment, the electronic device 101 may identify the first virtual key corresponding to the finger object, using the method described in operation 205 of FIG. 2.

Figure 11:
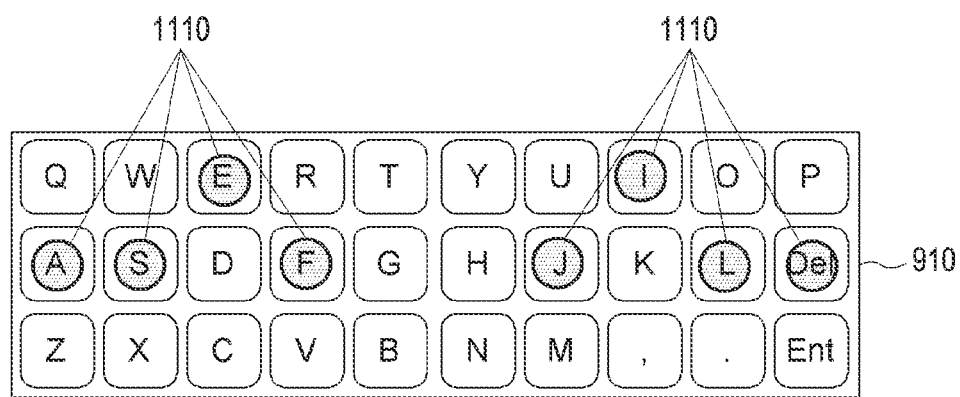
FIG. 11 illustrates an embodiment in which an electronic device displays visual effects on GUIs of virtual keys, according to various embodiments of the disclosure.

FIG. 11 illustrates an embodiment in which the electronic device 101 displays visual effects on GUIs of virtual keys, according to various embodiments of the disclosure.

According to an embodiment, when the finger object detected from the second image 320 meets the predetermined condition, the electronic device 101 may display a visual effect on the GUI of the first virtual key specified based on the position and the degree of bending of the finger object. For example, referring to FIG. 11, when each finger object detected from the second image 320 meets a predetermined condition, the electronic device 101 may display a visual effect 1110 (e.g., yellow highlight) on a GUI of each virtual key specified based on the position and the degree of bending of each finger object. According to an embodiment, the electronic device 101 may identify a second virtual key corresponding to the finger object, using the method described in operation 205 of FIG. 2, and control the display 160 to display visual effects on GUIs of the first virtual key and the second virtual key.

According to an embodiment, the electronic device 101 may identify the input of the first virtual key based on detecting the typing movement of the finger object. The electronic device 101 may identify the input of the first virtual key using the method described in operation 207. For example, referring to FIG. 9, the electronic device 101 may perform an operation (e.g., displaying a character assigned to the first virtual key) corresponding to the input of the first virtual key on a typing input area 901 of the first application 900 based on detecting the typing movement of the finger object.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic device is not limited to the above-listed embodiments.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, an electronic device (e.g., the electronic device 101 of FIG. 1) may include a camera (e.g., the camera module 180 of FIG. 1), a display (e.g., the display module 160 of FIG. 1), and a processor (e.g., the processor 120 of FIG. 1), and the processor may be configured to control the display 160 to display a second image determined based on a posture of the electronic device 101 from a first image obtained using the camera 180, detect a finger object from the second image, identify a first virtual key corresponding to the finger object from a virtual keyboard based on a position and a degree of bending of the finger object, and identify an input of the first virtual key based on detecting a typing movement of the finger object.

According to various embodiments, the processor may be configured to identify, from the second image, a plurality of regions having an interval determined based on a position of each finger object or a predetermined interval, and match key columns of the virtual keyboard to the plurality of regions.

According to various embodiments, a number of the plurality of regions may be the same as a number of the key columns of the virtual keyboard.

According to various embodiments, the processor may be configured to determine a key column of the virtual keyboard, which corresponds to the position of the finger object.

According to various embodiments, the processor may be configured to identify coordinate information of a specific portion of the finger object using the camera, and determine a key column corresponding to a region to which the coordinate information belongs as the key column corresponding to the position of the finger object.

According to various embodiments, the processor may be configured to identify the first virtual key specified by a key row corresponding to the degree of bending of the finger object from a plurality of virtual keys included in the key column.

According to various embodiments, the processor may be configured to: when a first distance on a first axis between first coordinates and second coordinates of the finger object exceeds a first threshold, and a second distance on a second axis is less than a second threshold, determine the degree of bending of the finger object as a first bending state, and identify a key in a first row corresponding to the first bending state among the plurality of virtual keys as the first virtual key; when the first distance of the finger object is a value between the first threshold and a third threshold, and the second distance is a value between the second threshold and a fourth threshold, determine the degree of bending of the finger object as a second bending state, and identify a key in a second row corresponding to the second bending state among the plurality of virtual keys as the first virtual key; and when the first distance of the finger object is less than the third threshold and the second distance exceeds the fourth threshold, determine the degree of bending of the finger object as a third bending state and identify a key in a third row corresponding to the third bending state among the plurality of virtual keys as the first virtual key, and the first threshold may be greater than the third threshold, and the fourth threshold may be greater than the second threshold.

According to various embodiments, the processor may be configured to detect the typing movement of the finger object based on a specific portion of the finger object moving more than a predetermined distance in a downward direction.

According to various embodiments, the processor may be configured to control the display to display a visual effect on a graphical user interface (GUI) of the first virtual key.

According to various embodiments, the processor may be configured to control the display to display a first guide indicator corresponding to a predetermined finger object when the predetermined finger object is not detected from the second image, and control the display to display a second guide indicator corresponding to the finger object when a ratio of a size of a specific portion of the finger object to a size of the second image is less than or equal to a first threshold ratio or greater than or equal to a second threshold ratio.

According to various embodiments, a method of operating an electronic device may include controlling a display of the electronic device to display a second image determined based on a posture of the electronic device from a first image obtained using a camera of the electronic device, detecting a finger object from the second image, identifying a first virtual key corresponding to the finger object from a virtual keyboard based on a position and a degree of bending of the finger object, and identifying an input of the first virtual key based on detecting a typing movement of the finger object.

According to various embodiments, the method of operating the electronic device may further include identifying, from the second image, a plurality of regions having an interval determined based on a position of each finger object or a predetermined interval, and matching key columns of the virtual keyboard to the plurality of regions.

According to various embodiments, identifying the first virtual key may include determining a key column of the virtual keyboard, which corresponds to the position of the finger object.

According to various embodiments, determining the key column of the virtual keyboard may include identifying coordinate information of a specific portion of the finger object using the camera, and determining a key column corresponding to a region to which the coordinate information belongs as the key column corresponding to the position of the finger object.

According to various embodiments, identifying the first virtual key may include identifying the first virtual key specified by a key row corresponding to the degree of bending of the finger object from a plurality of virtual keys included in the key column.

According to various embodiments, identifying the first virtual key may include when a first distance on a first axis between first coordinates and second coordinates of the finger object exceeds a first threshold, and a second distance on a second axis is less than a second threshold, determining the degree of bending of the finger object as a first bending state, and identifying a key in a first row corresponding to the first bending state among the plurality of virtual keys as the first virtual key; when the first distance of the finger object is a value between the first threshold and a third threshold, and the second distance is a value between the second threshold and a fourth threshold, determining the degree of bending of the finger object as a second bending state, and identifying a key in a second row corresponding to the second bending state among the plurality of virtual keys as the first virtual key; and when the first distance of the finger object is less than the third threshold and the second distance exceeds the fourth threshold, determining the degree of bending of the finger object as a third bending state and identifying a key in a third row corresponding to the third bending state among the plurality of virtual keys as the first virtual key, and the first threshold may be greater than the third threshold, and the fourth threshold may be greater than the second threshold.

According to various embodiments, the method of operating the electronic device may further include detecting the typing movement of the finger object based on a specific portion of the finger object moving more than a predetermined distance in a downward direction.

According to various embodiments, the method of operating the electronic device may further include controlling the display to display a visual effect on a graphical user interface (GUI) of the first virtual key.

According to various embodiments, an electronic device may include a camera, a display, and a processor, and the processor may be configured to, while executing a first application, control the display to display a second image determined based on a posture of the electronic device from a first image obtained through the camera, together with a virtual keyboard; when a finger object detected from the second image does not meet a predetermined condition, control the display to display a guide indicator corresponding to the predetermined condition; and when the finger object meets the predetermined condition, control the display to display a visual effect on a graphic user interface of a first virtual key corresponding to the finger object.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device comprising:
    a camera,
    a display, and
    a processor,
    wherein the processor is configured to:
        control the display to display a second image cropped from a first image obtained using the camera,
        detect a finger object corresponding to a finger in the second image,
        identify a position of the finger object in the second image,
        determine a degree of bending of the finger object by identifying a distance between points corresponding to predetermined portions of the finger,
        identify a first virtual key corresponding to the finger object in a virtual keyboard based on the identified position and the determined degree of bending of the finger object, and
        identify an input of the first virtual key based on detecting a typing movement of the finger object.

2. The electronic device of claim 1, wherein the processor is further configured to:
    identify, from the second image, a plurality of regions having an interval determined based on a position of each finger object or a predetermined interval, and
    match key columns of the virtual keyboard to the plurality of regions.

3. The electronic device of claim 2, wherein a number of the plurality of regions is a same as a number of the key columns of the virtual keyboard.

4. The electronic device of claim 1, wherein the processor is further configured to:
    determine a key column of the virtual keyboard, which corresponds to the position of the finger object.

5. The electronic device of claim 4, wherein the processor is further configured to:
    identify coordinate information of a specific portion of the finger object using the camera, and
    determine a key column corresponding to a region to which the coordinate information belongs as the key column corresponding to the position of the finger object.

6. The electronic device of claim 4, wherein the processor is further configured to:
    identify the first virtual key specified by a key row corresponding to the degree of bending of the finger object from a plurality of virtual keys included in the key column.

7. The electronic device of claim 6, wherein the processor is further configured to:
    when a first distance on a first axis between first coordinates and second coordinates of the finger object exceeds a first threshold, and a second distance on a second axis is less than a second threshold, determine the degree of bending of the finger object as a first bending state, and identify a key in a first row corresponding to the first bending state among the plurality of virtual keys as the first virtual key,
    when the first distance of the finger object is a value between the first threshold and a third threshold, and the second distance is a value between the second threshold and a fourth threshold, determine the degree of bending of the finger object as a second bending state, and identify a key in a second row corresponding to the second bending state among the plurality of virtual keys as the first virtual key, and
    when the first distance of the finger object is less than the third threshold and the second distance exceeds the fourth threshold, determine the degree of bending of the finger object as a third bending state and identify a key in a third row corresponding to the third bending state among the plurality of virtual keys as the first virtual key,
    wherein the first threshold is greater than the third threshold, and the fourth threshold is greater than the second threshold.

8. The electronic device of claim 1, wherein the processor is further configured to:
    detect the typing movement of the finger object based on a specific portion of the finger object moving more than a predetermined distance in a downward direction.

9. The electronic device of claim 1, wherein the processor is further configured to:
    control the display to display a visual effect on a graphical user interface (GUI) of the first virtual key.

10. The electronic device of claim 1, wherein the processor is further configured to:
    control the display to display a first guide indicator corresponding to a predetermined finger object when the predetermined finger object is not detected from the second image, and
    control the display to display a second guide indicator corresponding to the finger object when a ratio of a size of a specific portion of the finger object to a size of the second image is less than or equal to a first threshold ratio or greater than or equal to a second threshold ratio.

11. A method of operating an electronic device, comprising:
    controlling a display of the electronic device to display a second image cropped from a first image obtained using a camera of the electronic device,
    detecting a finger object corresponding to a finger in the second image,
    identifying a position of the finger object in the second image,
    determining a degree of bending of the finger object by identifying a distance between points corresponding to predetermined portions of the finger,
    identifying a first virtual key corresponding to the finger object in a virtual keyboard based on the identified position and the determined degree of bending of the finger object, and
    identifying an input of the first virtual key based on detecting a typing movement of the finger object.

12. The method of claim 11, further comprising:
identifying, from the second image, a plurality of regions having an interval determined based on a position of each finger object or a predetermined interval, and
matching key columns of the virtual keyboard to the plurality of regions.

13. The method of claim 12, wherein a number of the plurality of regions is a same as a number of the key columns of the virtual keyboard.

14. The method of claim 11, wherein identifying the first virtual key includes determining a key column of the virtual keyboard, which corresponds to the position of the finger object.

15. The method of claim 14, wherein determining the key column of the virtual keyboard comprises:
identifying coordinate information of a specific portion of the finger object using the camera, and
determining a key column corresponding to a region to which the coordinate information belongs as the key column corresponding to the position of the finger object.

16. The method of claim 14, wherein identifying the first virtual key includes identifying the first virtual key specified by a key row corresponding to the degree of bending of the finger object from a plurality of virtual keys included in the key column.

17. The method of claim 16, wherein identifying the first virtual key includes:
when a first distance on a first axis between first coordinates and second coordinates of the finger object exceeds a first threshold, and a second distance on a second axis is less than a second threshold, determining the degree of bending of the finger object as a first bending state, and identifying a key in a first row corresponding to the first bending state among the plurality of virtual keys as the first virtual key,
when the first distance of the finger object is a value between the first threshold and a third threshold, and the second distance is a value between the second threshold and a fourth threshold, determining the degree of bending of the finger object as a second bending state, and identifying a key in a second row corresponding to the second bending state among the plurality of virtual keys as the first virtual key, and
when the first distance of the finger object is less than the third threshold and the second distance exceeds the fourth threshold, determining the degree of bending of the finger object as a third bending state and identifying a key in a third row corresponding to the third bending state among the plurality of virtual keys as the first virtual key,
wherein the first threshold is greater than the third threshold, and the fourth threshold is greater than the second threshold.

18. The method of claim 11, further comprising detecting the typing movement of the finger object based on a specific portion of the finger object moving more than a predetermined distance in a downward direction.

19. The method of claim 11, further comprising controlling the display to display a visual effect on a graphical user interface (GUI) of the first virtual key.

20. An electronic device, comprising:
a camera,
a display, and
a processor,
wherein the processor is configured to:
control the display to display a second image determined based on a posture of the electronic device from a first image obtained using the camera,
detect a finger object from the second image,
identify a first virtual key corresponding to the finger object from a virtual keyboard based on a position and a degree of bending of the finger object,
identify an input of the first virtual key based on detecting a typing movement of the finger object,
control the display to display a first guide indicator corresponding to a predetermined finger object when the predetermined finger object is not detected from the second image, and
control the display to display a second guide indicator corresponding to the finger object when a ratio of a size of a specific portion of the finger object to a size of the second image is less than or equal to a first threshold ratio or greater than or equal to a second threshold ratio.

* * * * *